| United States Patent [19] | | | [11] | 3,923,683 |
|---|---|---|---|---|
| Michalski et al. | | | [45] | Dec. 2, 1975 |

[54] AMIDES AND HYDROPHOBIC SILICA AS ANTIFOAMS

[75] Inventors: Raymond J. Michalski, Riverdale; Roger W. Youngs, Hinsdale, both of Ill.

[73] Assignee: Nalco Chemical Company, Oak Brook, Ill.

[22] Filed: Jan. 9, 1974

[21] Appl. No.: 432,125

Related U.S. Application Data

[63] Continuation of Ser. No. 178,508, Sept. 7, 1971, abandoned.

[52] U.S. Cl. .............................. 252/321; 252/358
[51] Int. Cl.² ........................................ B01D 19/04
[58] Field of Search ............................ 252/358, 321

[56] References Cited
UNITED STATES PATENTS

| | | | |
|---|---|---|---|
| 3,076,768 | 2/1963 | Boylan | 252/358 |
| 3,207,698 | 9/1965 | Liebling et al. | 252/321 |
| 3,231,508 | 1/1966 | Lew | 252/358 X |
| 3,383,327 | 5/1968 | Sullivan | 252/358 |
| 3,673,105 | 6/1972 | Curtis et al. | 252/321 |
| 3,677,963 | 7/1972 | Lichtman | 252/358 |
| 3,697,440 | 10/1972 | Lichtman et al. | 252/321 |
| 3,730,907 | 5/1973 | Shane et al. | 252/358 |

*Primary Examiner*—Leland A. Sebastian
*Assistant Examiner*—David Leland
*Attorney, Agent, or Firm*—John G. Premo; Barry W. Sufrin

[57] ABSTRACT

A Brown Stock Wash Aid antifoam composition comprising a blend of a bis-amide, a liquid hydrocarbon oil, finely divided hydrophobic silica and silicone oil.

6 Claims, No Drawings

3,923,683

AMIDES AND HYDROPHOBIC SILICA AS ANTIFOAMS

This application is a continuation of our copending application Ser. No. 178,508, filed Sept. 7, 1971, now abandoned.

INVENTION

This invention relates to a new Brown Stock Wash Aid which is composed of a bis-amide, a liquid hydrocarbon oil, finely divided hydrophobic silica and silicone oil. The compounds are useful for controlling and suppressing foaming of aqueous systems having foaming tendencies.

There are many industrial processes in which aqueous solutions or suspensions are processed. Frequently, due to the nature of the components in the aqueous system, foaming is a serious problem which must be prevented or mitigated to prevent interference by the foam with the efficient conduct of the process.

Illustrative types of aqueous systems in which appreciable foaming occurs are cellulosic suspensions of the type used in the manufacture of various types of paper, sewage disposal systems, detergent-containing systems, saponin-containing systems, protein-containing systems and the like. In the paper industry foaming problems are encountered in black liquor which is the spent cooking liquor obtained after cooking of wood pulp in accordance with the sulfate or Kraft process, particularly during the evaporation of black liquor prior to the recovery of the chemicals in the black liquor. Foaming is also a problem in the handling and utilization of Kraft paper slurries, sulfide pulp slurries and groundwood pulp slurries in papermaking machines, including machines used prior to formation of the fibrous matter, such as beaters, refiners, mixers and flow boxes. Similarly, many protein-containing systems such as solutions of soybean protein extract present foaming problems.

The anti-foaming agents of this invention have proven to be especially active in defoaming Kraft pulp stock and sulfide pulp stock used in the preparation of Kraft and sulfate paper. Kraft pulp aqueous slurries have an alkaline pH in the range of 8 to 10, and sulfide aqueous pulp slurries have a pH which is about neutral. The anti-foaming agents of this invention may also be used to control foam in groundwood aqueous pulp slurries in which the pH is acid in the range of about 4 to 5.5.

OBJECTS

Therefore, an object of this invention is to provide an antifoam composition which has general application to various industrial processes.

Another object of the invention is to provide a low viscosity antifoam which can be easily pumped.

A preferred object of the invention is to provide an antifoam that is especially useful for the control of foam in Kraft pulp stock and sulfide pulp stock.

Further objects will be apparent to those skilled in the art.

THE INVENTION

The Brown Stock Wash Aid anti-foaming composition is comprised of a blend of a liquid hydrocarbon oil, a finely divided hydrophobic silica, a bis-amide and a silicone oil. The components of this blend are present in the percentages as follows:

| Component | Percent By Weight |
| --- | --- |
| A. Liquid hydrocarbon oil | |
| General Range | 70–98 |
| Preferred Range | 86–93 |
| Most Preferred Range | 88 |
| B. Finely divided hydrophobic silica | |
| General Range | 0.1–5 |
| Preferred Range | 1.0–2 |
| Most Preferred Range | 1 |
| C. A bis-amide | |
| General Range | 1–20 |
| Preferred Range | 5–10 |
| Most Preferred Range | 10 |
| D. Silicone oil | |
| General Range | 0.1–5 |
| Preferred Range | 1.0–2.0 |
| Most preferred Range | 1 |

A small amount of the above composition is effective in reducing foam and in retaining and holding down the initial foam breakdown. This dosage can range from 1.0 to 2000 ppm and preferably 10 to 1000 ppm by weight. A few drops of this composition is much more effective than the standard anti-foaming compositions now used. This composition may be used as an anti-foaming agent without resort to a combination with other ingredients.

THE LIQUID HYDROCARBON OIL

The liquid hydrocarbon oil is comprised of an inert hydrophobic liquid. The oils used in preparing these antifoam compounds may be selected from a large group of organic liquids which include liquid hydrocarbons and substituted liquid hydrocarbons. A preferred group of organic liquids are hydrocarbon liquids which include blends of aromatic and aliphatic hydrocarbon compounds. Thus, such organic hydrocarbon liquids as hexane, heptane, octane, benzene, xylene, toluene, paraffin oil, mineral oils, kerosenes, napthas, and in certain instances, petroleums may be used. If desired, mixtures of any two or more of these or other similar hydrocarbons can be employed. The preferred hydrocarbon oil is paraffin oil.

THE HYDROPHOBIC SILICA

The second component of the anti-foaming composition of this invention comprises a hydrophobic silica. Hydrophobic silicas are known precisely by that designation in the art, but nonetheless hydrophobic silica is defined herein as a finely-divided silica (e.g., that precipitated from silica hydorsol) treated with an oil or some other hydrophobic material such as a suitable silicone which renders the silica particles themselves hydrophobic. The purpose of the hydrophobic silica in this invention is as a viscosity reducing agent. The amides in the formulations of this invention are of high viscosity which results in difficult pumping. The addition of a small amount of hydrophobic silica results in decreased viscosity and therefore improved pumping.

The hydrophobic silica utilized in this invention will desirably have an average particle size less than about 10 microns and preferably less than about 5 microns. Most preferred is an average particle size from about 0.02 microns to about 1.0 microns. Hydrophobic silicas are easily prepared by methods known to those skilled in the art. The preferred hydrophobic silica of this invention is prepared by precipitating colloidal amorphous silica from sodium silicate solution and exposing said silica to methylchlorosilane vapors until reaction at the surface of the silica is complete. Various other types of hydrophobic silicas as well as other techniques are described in detail in U.S. 3,408,306.

THE AMIDE

The amides which are used in this invention are of the bis-amide type having the following structure:

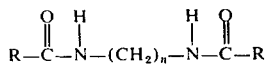

where:
n is an integer from 1 to 6; and
R is a saturated or unsaturated, straight or branched chain aliphatic group having from 5 to 22 carbon atoms.

Preferably, n is 1 and R contains from 12–22 carbon atoms and is a saturated hydrocarbon group. A typical preferred compound is methylene bis stearamide.

The bis-amide acts as a foam stabilizer for many ionic surfactants. Stabilization increases with increasing chain lengths. Typical saturated bis-amides which can be employed in this invention are listed below:
methylene bis caprylamide
methylene bis pelargonamide
ethylene bis capramide
methylene bis lauamide
methylene bis myristamide
methylene bis palmitamide
methylene bis stearamide
ethylene bis arachidamide
ethylene bis behenamide Typical unsaturated amides which can be employed in this invention are listed below:
hexylene bis linolenamide
propylene bis linoleamide
propylene bis oleamide
pentylene bis brucamide

THE SILICONE OIL

Linear polydimethylsiloxanes have been found to be useful in the practice of this invention. The intermolecular forces are weak, resulting in low melting points, low boiling, high compressibility, small change of viscosity with temperature, and general physical weakness despite high molecular weights. These silicone oils are described in detail in Kirk-Othmer's Encyclopedia of Chemical Technology, Volume 18. In general the boiling point range is between 95°–300°C. while viscosity ranges between 10.0 to 500 ctsk.

The preferred silicone oil is polydimethylsiloxane. A typical polydimethylsiloxane is Union Carbide's L-45. While the silicone oil is preferably the one specified, any other silicone oil presenting alkyl or phenyl groups may be used.

The following examples show the preparation of the preferred antifoam compositions of the invention.

EXAMPLE I

| Ingredients in Tank No. 1 | Percent by weight |
|---|---|
| Paraffin Oil | 28 |
| Hydrophobic Silica | 1 |
| Polydimethylsiloxane | |
| (Union Carbide L45) | 1 |
| Methylene Bis Stearamide | 10 |

-continued

| Ingredients in Tank No. 1 | Percent by weight |
|---|---|

| Ingredients in Tank No. 2 | Percent by weight |
|---|---|
| Paraffin Oil | 60 |

In Tank No. 1 the hydrophobic silica, paraffin oil, and silicone oil are blended and heated to 250°F. with stirring. Then the amide is added slowly and allowed to melt. The mixture was heated to 270°F. and stirring continued until the blend was clear and fluid.

Tank No. 2 consisted solely of the remaining paraffin oil at room temperature.

The contents of Tank 2 was added to Tank No. 1 with mixing and at such a rate that the temperature of Tank No. 1 remained in the range between 175°–200°F. The temperature must be kept in this range so that the amide will not drop out of solution. When the addition was completed, the mixture was homogenized for 3 hours at which time the product was cooled and removed from the reactor.

Using the same preparative techniques as shown in Example I, the following additional compositions were prepared.

EXAMPLE II

| Ingredients in Tank No. 1 | Percent by weight |
|---|---|
| Mineral Seal Oil | 28 |
| Hydrophobic Silica | 1 |
| Polydimethylsiloxane | |
| (Union Carbide L45) | 1 |
| Methylene Bis Stearamide | 10 |

| Ingredients in Tank No. 2 | Percent by weight |
|---|---|
| Mineral Seal Oil | 60 |

EXAMPLE III

| Ingredients in Tank No. 1 | Percent by weight |
|---|---|
| Paraffin Oil | 28 |
| Hydrophobic Silica | 1 |
| Polydimethylsiloxane | |
| (Union Carbide L45) | 1 |
| Methylene Bis Palmitamide | 10 |

| Ingredients in Tank No. 2 | Percent by weight |
|---|---|
| Paraffin Oil | 60 |

EVALUATION OF THE ANTIFOAMING AGENTS

The composition of Example I was tested for its antifoaming activity on synthetic Kraft pulp stock and neutral paper stock.

The Kraft pulp stock test comparing the antifoam activity of a commercial antifoam and the antifoam of Example I was conducted as follows:

Two hundred ml. of a standard Kraft pulp testing stock and a measured quantity of antifoaming agent were added to a calibrated tube having a course sintered glass aerator at the bottom. Air was bubbled into the stock through the aerator at a rate of 36 cc/min. The amount of foam was developed after 30 seconds and 60 seconds of aeration was read and recorded.

The results of the tests are reported in the following table in which the composition of Example I was compared against the commercial antifoam sold as an antifoaming agent for paper stock.

TABLE I

| ANTIFOAM ACTIVITY ON KRAFT STOCK | | | |
|---|---|---|---|
| | Dosage | Foam Height | |
| Antifoam | p.p.m. | 30 sec. | 60 sec. |
| Commercial Antifoam | 2.5 | 3.5 | 5.5 |
| Example I | 2.5 | 1.9 | 2.8 |

Two hundred ml of a standard neutral paper testing stock and a measured quantity of a commercial antifoaming agent or the antifoaming agent of Example I were added to a calibrated tube having a coarse sintered glass aerator at the bottom. Air was bubbled through the aerator at a rate of 36 cc/min. The amount of foam developed after 30 seconds and 60 seconds of aeration was read and recorded.

The results of these tests are reported in the following table.

TABLE II

| ANTIFOAM ACTIVITY ON NEUTRAL PAPER STOCK | | | |
|---|---|---|---|
| | Dosage | Foam Height, cm. | |
| Antifoam | p.p.m. | 30 sec. | 60 sec. |
| Example I | 15 | 1.8 | 2.0 |
| Example I | 10 | 2.9 | 3.4 |
| Commercial Antifoam | 15 | 2.4 | 3.1 |

We claim:

1. An antifoam composition comprising a blend of:
   A. a liquid hydrocarbon oil having concentration ranging between 70 to 98.8% by weight;
   B. a finely divided hydrophobic silica having a concentration ranging between 0.1 to 5.0% by weight;
   C. a bis-amide in a concentration ranging between 1 to 20% by weight having the following structure:

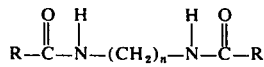

where:
   $n$ is an integer from 1 to 6; and
   R is a saturated or unsaturated, straight or branched chain aliphatic group having from 5 to 22 carbon atoms; and
   D. a silicone oil having a concentration ranging between 0.1 to 5.0% by weight.

2. An antifoam composition comprising a blend of:
   A. a liquid hydrocarbon oil having the preferred concentration ranging between 86 to 93% by weight;
   B. a finely divided hydrophobic silica having the preferred concentration ranging between 1.0 to 2.0% by weight;
   C. a bis-amide in the preferred concentration ranging between 5 to 10% by weight having the following structure:

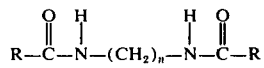

where:
   $n$ is an integer from 1 to 6; and
   R is a saturated or unsaturated, straight or branched chain aliphatic group having from 12 to 22 carbon atoms; and
   D. a silicone oil having the preferred concentration ranging between 1.0 to 2.0% by weight.

3. The composition of claim 1 wherein the preferred hydrocarbon oil is paraffin oil.

4. The composition of claim 1 wherein the preferred value of $n$ is 1.

5. The composition of claim 1 wherein the preferred amide is methylene is stearmide.

6. An antifoam composition comprising a blend of:
   A. paraffin oil having a concentration of 88%;
   B. finely divided hydrophobic silica having a concentration of 1%;
   C. methylene bis stearamide having a concentration of 10%; and
   D. polydimethylsiloxane having a concentration of 1%.

* * * * *

UNITED STATES PATENT OFFICE
CERTIFICATE OF CORRECTION

Patent No. 3,923,683  Dated December 2, 1975

Inventor(s) RAYMOND J. MICHALSKI and ROGER W. YOUNGS

It is certified that error appears in the above-identified patent and that said Letters Patent are hereby corrected as shown below:

<u>CLAIM 5</u> "AMIDE IS METHYLENE IS STEARAMINE"

SHOULD READ --AMIDE IS METHYLENE BIS STEARAMIDE--

Signed and Sealed this thirteenth Day of April 1976

[SEAL]

Attest:

RUTH C. MASON
*Attesting Officer*

C. MARSHALL DANN
*Commissioner of Patents and Trademarks*